US012162420B1

United States Patent
Patel et al.

(10) Patent No.: US 12,162,420 B1
(45) Date of Patent: Dec. 10, 2024

(54) VEHICLE AIRBAG ASSEMBLY (71) Applicant: Ford Global Technologies, LLC, Dearborn, MI (US)

(72) Inventors: Deepak Patel, Canton, MI (US); Zhibing Deng, Northville, MI (US); Joseph E. Abramczyk, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/451,938

(22) Filed: Aug. 18, 2023

(51) Int. Cl.
  *B60R 21/207* (2006.01)
  *B60R 21/01* (2006.01)
  *B60R 21/013* (2006.01)
  *B60R 21/015* (2006.01)
  *B60R 21/26* (2011.01)
  *B60R 21/264* (2006.01)

(52) U.S. Cl.
  CPC .......... *B60R 21/207* (2013.01); *B60R 21/013* (2013.01); *B60R 21/01512* (2014.10); *B60R 21/264* (2013.01); *B60R 2021/01245* (2013.01); *B60R 2021/01286* (2013.01); *B60R 2021/26094* (2013.01)

(58) Field of Classification Search
  CPC ............... B60R 21/013; B60R 21/207; B60R 2021/26094; B60R 2021/01286; B60R 2021/01245; B60R 21/264
  USPC ...................................... 280/730, 734, 728.2
  See application file for complete search history.

(56) References Cited

U.S. PATENT DOCUMENTS

| | | | | |
|---|---|---|---|---|
| 5,709,405 A * | 1/1998 | Saderholm | .......... | B60R 21/2171 280/739 |
| 7,413,220 B2 * | 8/2008 | Itoga | ................... | B60R 22/1952 280/741 |
| 7,677,598 B1 | 3/2010 | Ryan et al. | | |
| 8,100,215 B2 * | 1/2012 | Huh | ..................... | B60R 21/0136 180/274 |
| 9,150,175 B1 * | 10/2015 | Farooq | .................... | B60R 21/34 |
| 10,836,339 B2 * | 11/2020 | Kadam | ................. | B60R 21/203 |
| 11,052,860 B2 * | 7/2021 | Zeng | ..................... | B60R 21/233 |
| 11,110,881 B1 * | 9/2021 | Deng | .................... | B60R 21/207 |
| 11,267,427 B1 | 3/2022 | Deng et al. | | |
| 11,479,200 B1 * | 10/2022 | Gao | ......................... | B60R 21/20 |
| 2008/0234899 A1 * | 9/2008 | Breed | ................... | G01F 23/804 701/1 |
| 2020/0062213 A1 * | 2/2020 | Gao | ...................... | B60R 21/013 |

FOREIGN PATENT DOCUMENTS

| | | |
|---|---|---|
| JP | 2008201298 A | 9/2008 |
| KR | 20070039775 A | 4/2007 |

* cited by examiner

*Primary Examiner* — Amy R Weisberg
*Assistant Examiner* — Caitlin Anne Miller
(74) *Attorney, Agent, or Firm* — Frank A. MacKenzie; Bejin Bieneman PLC (57) ABSTRACT

A vehicle includes a seat assembly having a seat bottom and a seatback. The vehicle includes a middle console adjacent the seat assembly. The vehicle includes an airbag inflatable from an uninflated position to an inflated position. The airbag is supported by the seatback in the uninflated position and the inflated position. The vehicle includes an inflator supported by the middle console, the inflator operatively connected to the airbag to provide inflation medium.

20 Claims, 9 Drawing Sheets

VEHICLE AIRBAG ASSEMBLY

BACKGROUND

A vehicle may include one or more airbags deployable during certain vehicle impacts to control kinematics of occupants inside the vehicle during the impact. The airbag may be a component of an airbag assembly including a housing supporting the airbag, and an inflation device in communication with the airbag for inflating the airbag from an uninflated position to an inflated position.

DETAILED DESCRIPTION

A vehicle includes a seat assembly having a seat bottom and a seatback. The vehicle includes a middle console adjacent the seat assembly. The vehicle includes an airbag inflatable from an uninflated position to an inflated position, the airbag being supported by the seatback in the uninflated position and the inflated position. The vehicle includes an inflator supported by the middle console, the inflator operatively connected to the airbag to provide inflation medium.

The vehicle may include a second seat assembly having a seat bottom and a seatback, and a second airbag inflatable from an uninflated position to an inflated position, the second airbag being supported by the seatback of the second seat assembly, the inflator being operatively connected to second airbag.

The vehicle may include a valve between the inflator, the airbag, and the second airbag, the valve being moveable to selectively connect the inflator to the airbag and the second airbag.

The vehicle may include a valve between the inflator, the airbag and the second airbag, the valve being movable between a first position in which the valve fluidly connects the inflator to the airbag and fluidly disconnects the inflator and the second airbag to provide inflation medium to the airbag and not the second airbag, a second position in which the valve fluidly connects the inflator to the second airbag and fluidly disconnects the inflator and the airbag, and a third position in which the valve fluidly connects the inflator to the airbag and the second airbag.

The vehicle may include a computer having a processor and a memory storing instructions executable by the processor to move the valve to the first position or the second position, then, actuate the inflator to provide inflation medium, and then, move the valve to the third position.

The instructions may include instructions to move the valve to the third position a predetermined amount of time after actuating the inflator to provide inflation medium.

The vehicle may include an actuator configured to move the valve to the first position and the second position.

The vehicle may include a second actuator configured to move the valve to the third position.

The actuator may include a motor and the second actuator may be a pyrotechnically-activated device.

The valve may initially be at the first position, and the vehicle may include a computer having a processor and a memory storing instructions executable by the processor to detect a certain potential impact to a first side of the vehicle, and in response to detecting the certain potential impact to the first side of the vehicle, move the valve to the second position.

The instructions may include instructions to detect a certain impact to the first side of the vehicle, and in response to detecting the certain impact to the first side of the vehicle, actuate the inflator to provide inflation medium and move the valve to the third position.

The instructions may include instructions to detect whether the second seat assembly is occupied, and in response to detecting that the second seat assembly is occupied, move the valve to the third position a predetermined amount of time after actuating the inflator to provide inflation medium.

The predetermined amount of time may be 10 to 30 milliseconds.

The instructions may include instructions to detect a certain impact to a second side of the vehicle, and in response to detecting the certain impact to the second side of the vehicle, actuate the inflator to provide inflation medium and move the valve to the third position the predetermined amount of time after actuating the inflator to provide inflation medium.

The instructions may include instructions to determine that a certain impact to the first side of the vehicle has not been detected within a predetermined amount of time from moving the valve to the first position, and in response to determining that the certain impact to the first side of the vehicle has not been detected, move the valve to the second position.

The vehicle may include a revolute joint connecting the inflator to the airbag.

The vehicle may include a braided metal tube connecting the revolute joint to the inflator.

With reference to the Figures, wherein like numerals indicate like parts throughout the several views, a vehicle 20 with a seat assembly 22a, 22b is shown. The seat assembly 22a, 22b has a seat bottom 24 and a seatback 26. The vehicle 20 includes a middle console 28 adjacent the seat assembly 22a, 22b. The vehicle 20 includes an airbag 30a, 30b inflatable from an uninflated position to an inflated position.

The airbag 30a, 30b is supported by the seatback 26 in the uninflated position and the inflated position. The vehicle 20 includes an inflator 32 supported by the middle console 28, the inflator 32 operatively connected to airbag 30a, 30b to provide inflation medium.

Figure 1:
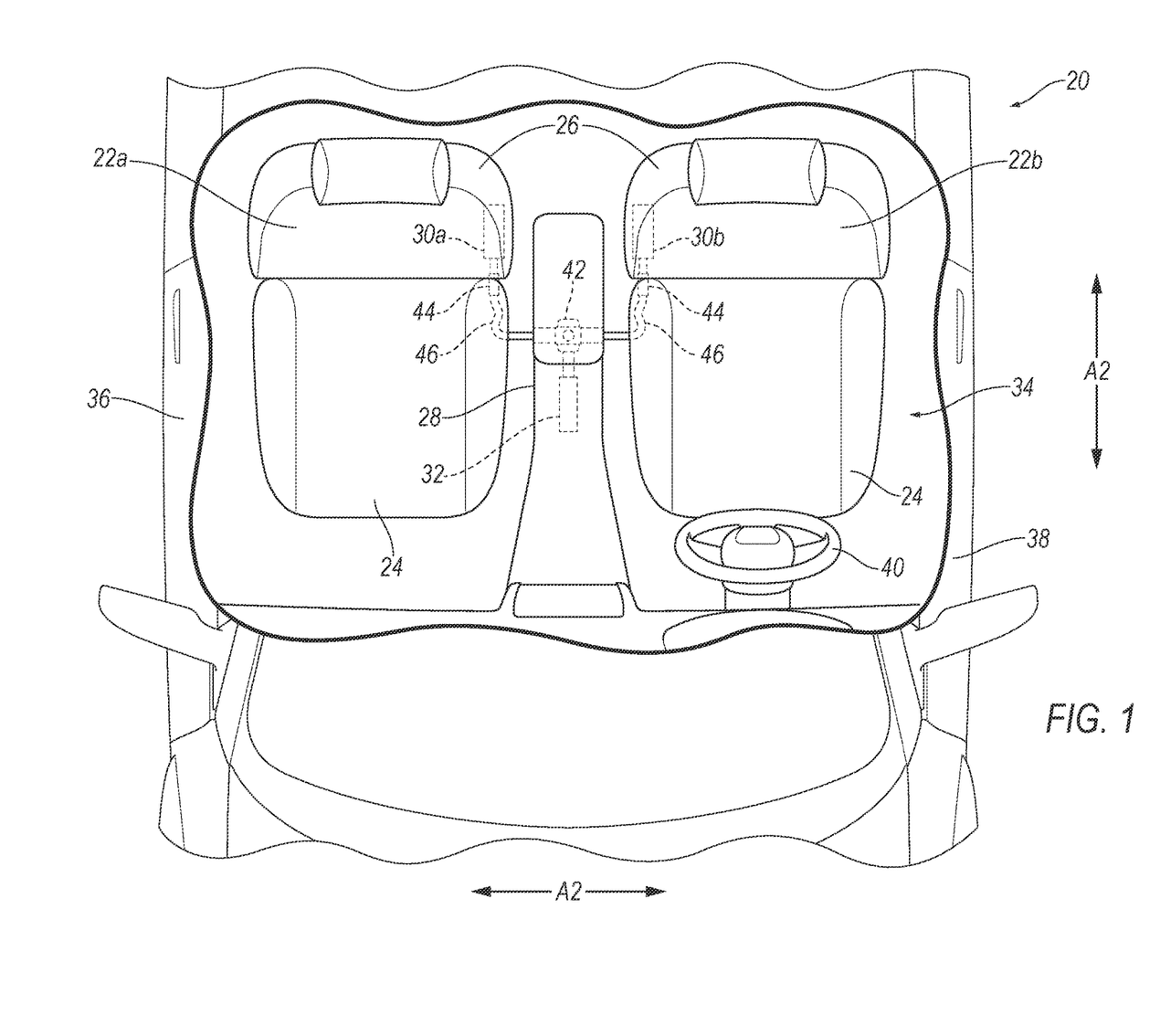
FIG. 1 is a top view of a portion of a vehicle broken away to show a passenger cabin and seat assemblies with airbags in uninflated positions.
Figure 2:
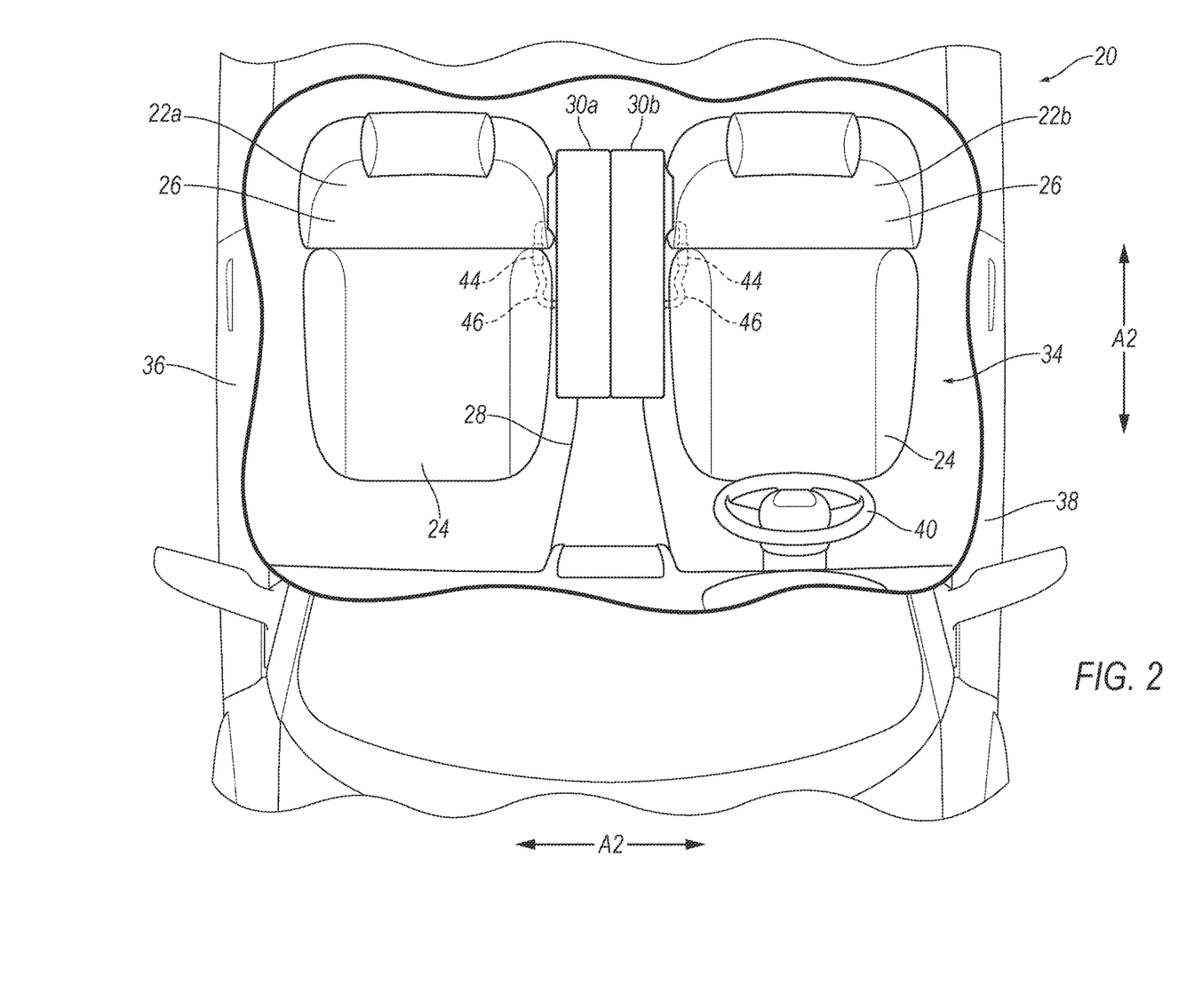
FIG. 2 is a top view of the portion of the vehicle broken away to show the passenger cabin and seat assemblies with the airbags inflated positions.

With reference to FIGS. 1 and 2, the vehicle 20 may be any suitable type of automobile, e.g., a passenger or commercial automobile such as a sedan, a coupe, a truck, a sport utility vehicle, a crossover vehicle, a van, a minivan, a taxi, a bus, etc.

The vehicle 20 may define a passenger cabin 34 to house occupants, if any, of the vehicle 20. The passenger cabin 34 may extend across the vehicle 20, e.g., from a left side of the vehicle 20 to a right side of the vehicle 20. The passenger cabin 34 includes a front end and a rear end with the front end being in front of the rear end during forward movement of the vehicle 20.

One or more seat assemblies 22a, 22b may be supported in the passenger cabin 34, e.g., supported by and fixed to a floor of the vehicle 20. For example, a first seat assembly 22a may be supported at a first side 36 of the vehicle 20 and a second seat assembly 22b may be supported at a second side 38 of the vehicle 20. The first side 36 and the second side 38 of the vehicle 20 may be arranged along a vehicle-lateral axis A1. For example, the first side 36 may be a right side and the second side 38 may be a left side of the vehicle 20. The second side 38 of the vehicle 20 may be a driver side. For example, a steering wheel 40 for controlling the pointing direction of wheels of the vehicle 20 may be supported at the second side 38 of the vehicle 20, e.g., by an instrument panel at the front of the passenger cabin 34.

Each seat assembly 22a, 22b includes the seatback 26 and the seat bottom 24 that can support an occupant of the seat assembly 22a, 22b. For example, the occupant of the seat assembly 22a, 22b may sit atop a top surface of the seat bottom 24 and recline against the seatback 26. The seatback 26 and the seat bottom 24 can each include a frame. The frames may include tubes, beams, etc. The frames may be of any suitable plastic material, e.g., carbon fiber reinforced plastic (CFRP), glass fiber-reinforced semi-finished thermoplastic composite (organosheet), etc. As another example, some or all components of the frames may be formed of a suitable metal, e.g., steel, aluminum, etc. The seat back and/or the seat bottom 24 can include a covering. The covering may include upholstery and padding. The upholstery may be cloth, leather, faux leather, or any other suitable material. The upholstery may be stitched in panels around the frames. The padding may be between the upholstery and the frame. The padding may be foam or any other suitable material. The seatback 26 may be stationary or movable relative to the seat bottom 24. The seatback 26 and the seat bottom 24 may be adjustable in multiple degrees of freedom. Specifically, the seatback 26 and the seat bottom 24 may themselves be adjustable, in other words, adjustable components within the seatback 26 and/or the seat bottom 24, and/or may be adjustable relative to each other.

The middle console 28 of the vehicle 20 is adjacent, i.e., next to, the seat assemblies 22a, 22b. The middle console 28 is between the first seat assembly 22a and the second seat assembly 22b, e.g., along the vehicle-lateral axis A1. The middle console 28 may be on a longitudinal midline of the vehicle 20, as shown in the Figures. In other examples, the middle console assembly may be in the middle of two adjacent seat assemblies, e.g., the first seat assembly 22a and the second seat assembly 22b, and offset from the longitudinal midline of the vehicle 20. The middle console 28 may be elongated along a vehicle-longitudinal axis A2. The middle console 28 may include an armrest, cupholders, etc.

The vehicle 20 includes one or more airbags 30a, 30b, e.g., a first airbag 30a and a second airbag 30b, for controlling kinematics of one or more occupants of the passenger cabin 34 during certain impacts to the vehicle 20. The airbags 30a, 30b may be supported by, e.g., fixed to, the seat assemblies 22a, 22b. For example, the first airbag 30a may be supported by the seatback 26 of the first seat assembly 22a and the second airbag 30b may be supported by the seatback 26 of the second seat assembly 22b. The airbags 30a. 30b may be fixed to the frames of the seatbacks 26 of the first seat assembly 22a and the second seat assembly 22b, e.g., via fastener, bracket, airbag housing, etc. The airbags 30a, 30b may be at vehicle-inboard sides of the seatbacks 26, e.g., adjacent the middle console 28. The vehicle 20 may include one or more airbags in addition to the first airbag 30a and the second airbag 30b, e.g., front airbags, curtain airbags, etc.

The first airbag 30a and the second airbag 30b are each inflatable from uninflated positions, shown FIG. 1, to inflated positions, shown in FIG. 2. The airbags 30a, 30b are supported by the respective seatback 26 in both the uninflated position and the inflated position. The airbags 30a, 30b in the uninflated positions may be internal the covering the seatbacks 26. The airbags 30a, 30b in the inflated positions may be external the covering the seatbacks 26, e.g., extending forward from the seatbacks 26 along the middle console 28. The first airbag 30a and the second airbag 30b may each include panels of a woven polymer, or any other suitable material, that define inflation chambers that can receive inflation medium to inflate the first airbag 30a and the second airbag 30b to the inflated positions. As one example, the first airbag 30a and the second airbag 30b may be formed of woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

The inflator 32 is operatively connected to both the first airbag 30a and the second airbag 30b to provide inflation medium for inflating the first airbag 30a and the second airbag 30b to the inflated positions. The inflator 32 may be, for example, a pyrotechnic inflator that uses a chemical reaction to drive inflation medium to the first airbag 30a and/or the second airbag 30b. The inflator 32 may be of any suitable type, for example, a cold-gas inflator. The inflator 32 may provide sufficient inflation medium to inflate both the first airbag 30a and the second airbag 30b to the inflated positions. The inflator 32 is supported by the middle console 28. For example, the inflator 32 may be supported within the middle console 28. The inflator 32 may be fixed the middle console 28, e.g., via fastener, bracket, and/or other structure.

The inflator 32 may be operatively connected to the first airbag 30a and the second airbag 30b such that inflation medium from the inflator 32 can be directed to the inflation chamber of the first airbag 30a and/or the second airbag 30b. For example, the inflator 32 may be operatively connected to the first airbag 30a and the second airbag 30b via a valve 42, revolute joints 44, fill tubes 46, or other suitable structure, including, in some examples, conventional structures.

Figure 3:
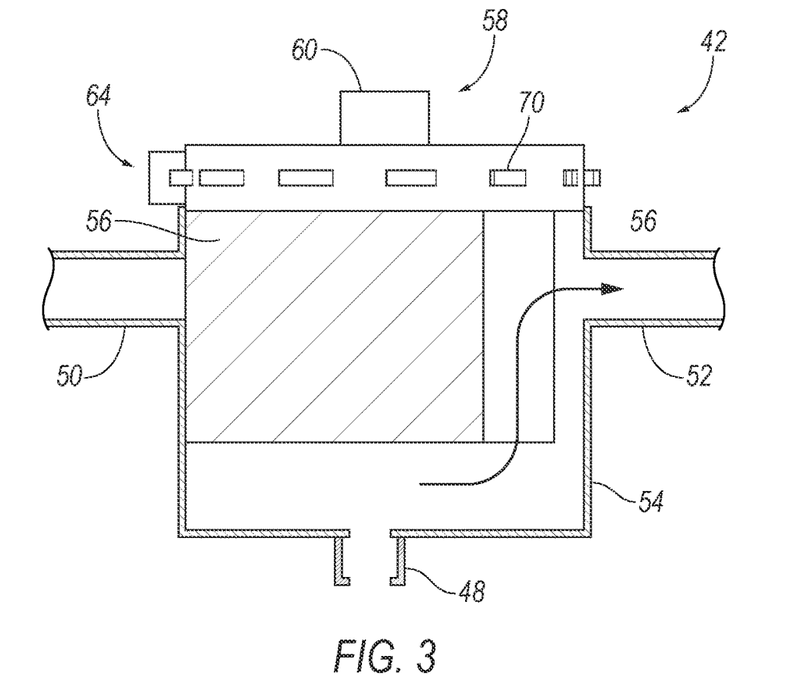
FIG. 3 is a side cross section view of a valve in a first position that directs inflation medium to one of the airbags.
Figure 4:
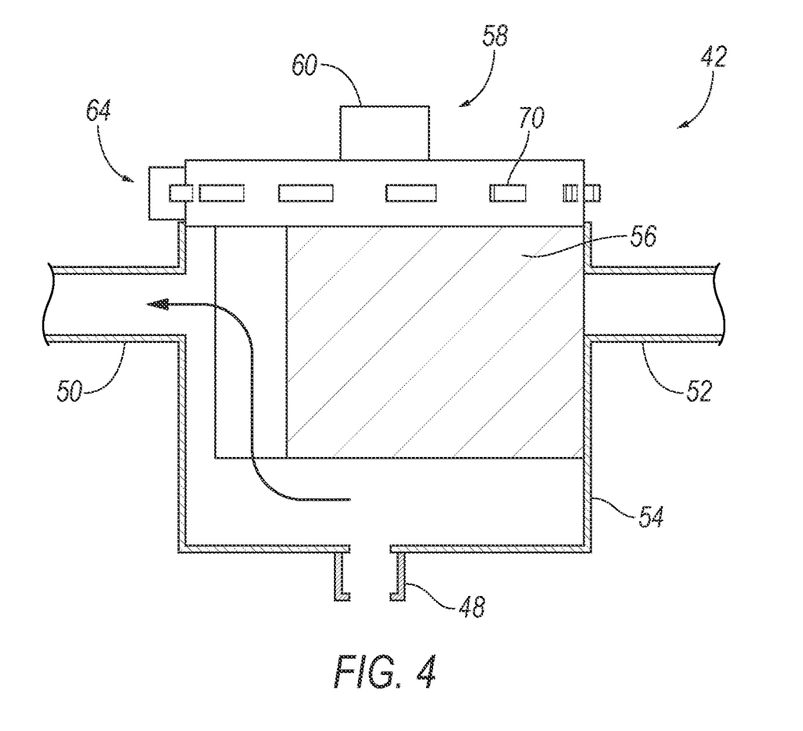
FIG. 4 is a side cross section view of the valve in a second position that directs inflation medium to another of the airbags.
Figure 5:
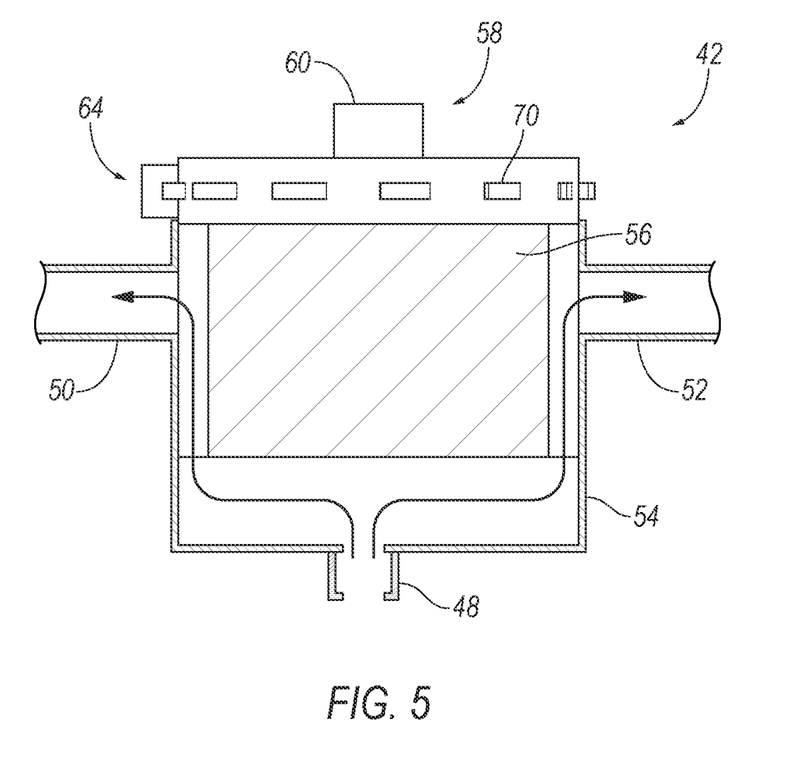
FIG. 5 is a side cross section view of the valve in a third position that directs inflation medium to both of the airbags.
Figure 6:
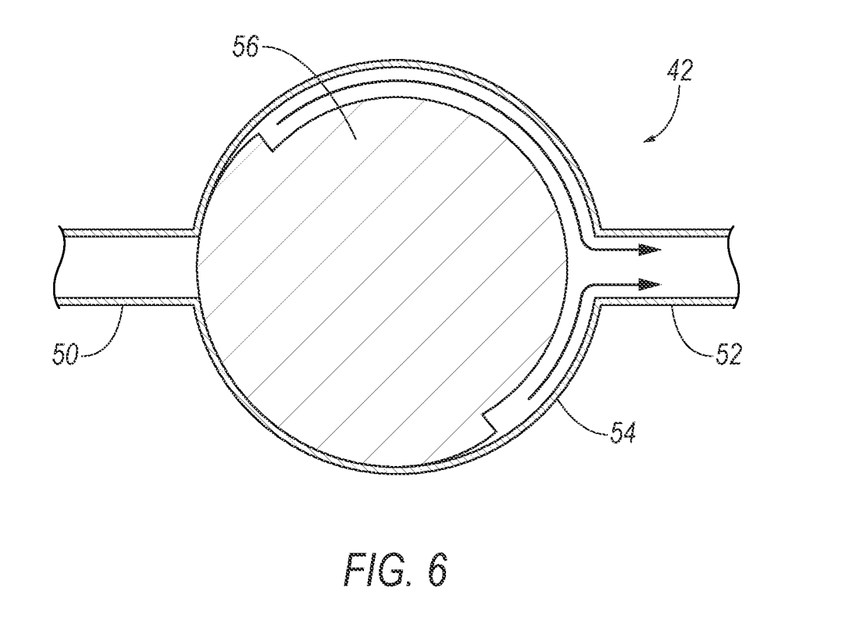
FIG. 6 is a top cross section view of the valve in the first position that directs inflation medium to one of the airbags.
Figure 7:
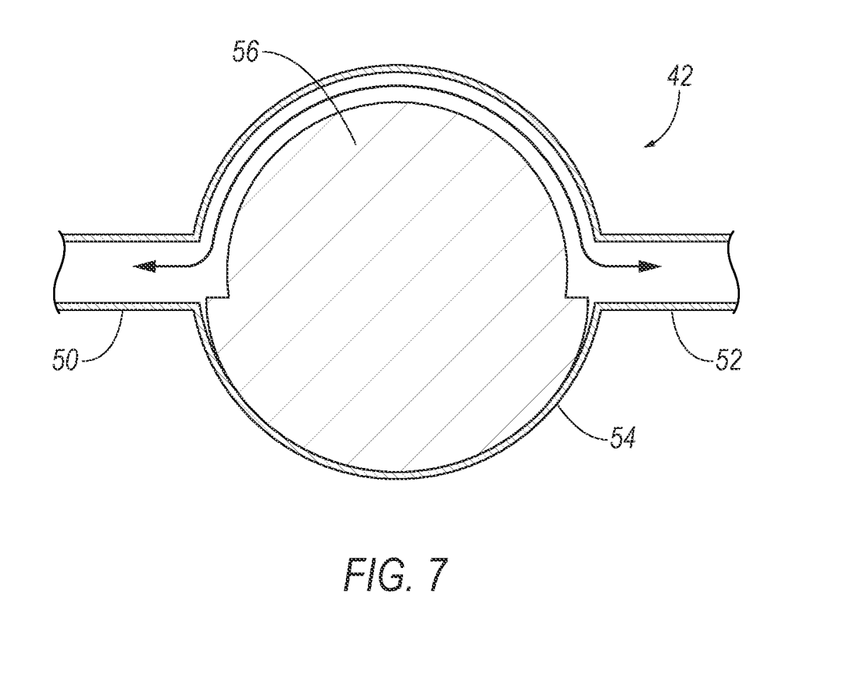
FIG. 7 is a top cross section view of the valve in the third position that directs inflation medium to both of the airbags.
Figure 8:
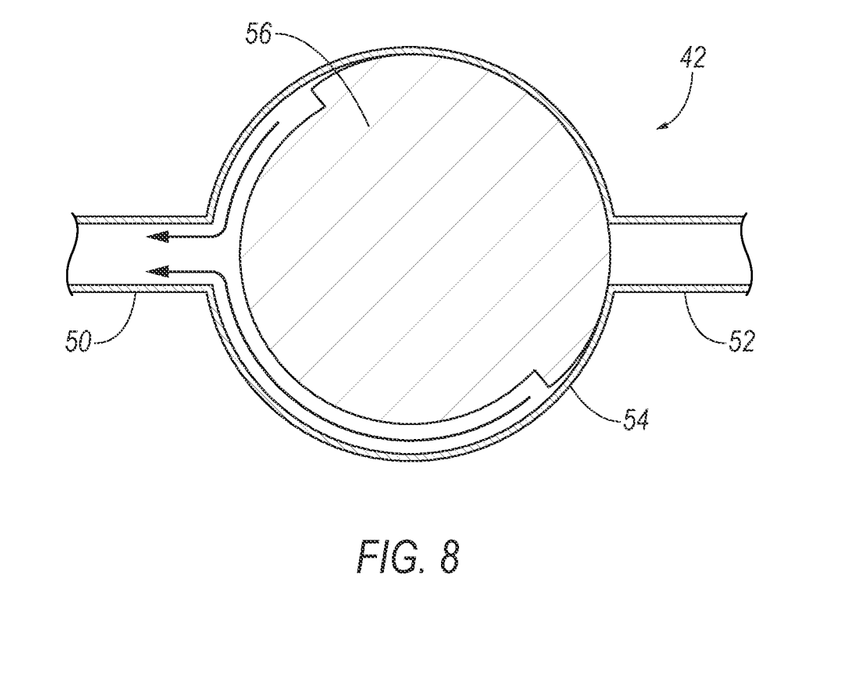
FIG. 8 is a top cross section view of the valve in the second position that directs inflation medium to another of the airbags.
Figure 9:
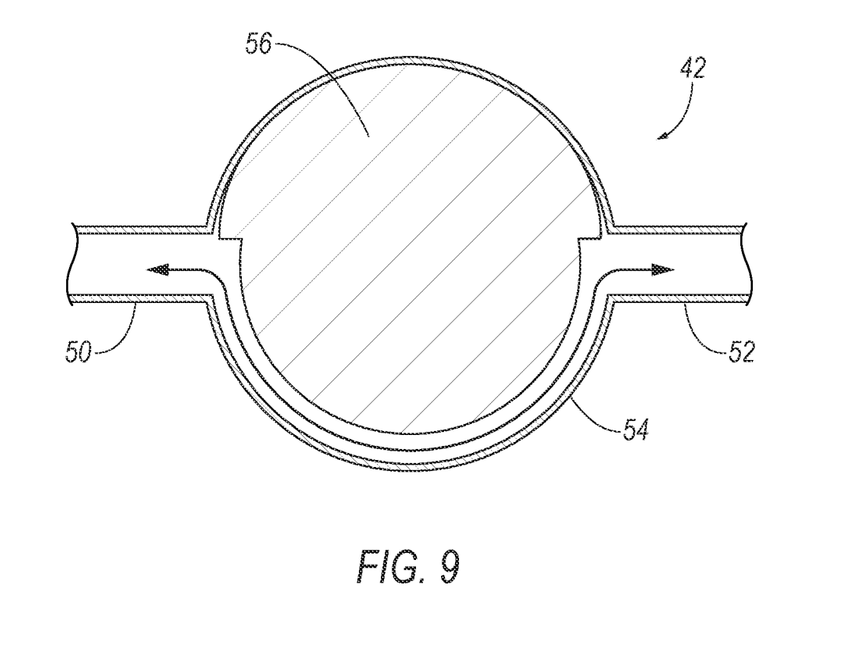
FIG. 9 is a top cross section view of the valve in another third position that directs inflation medium to both of the airbags.

The vehicle 20 includes the valve 42 between the inflator 32, the first airbag 30a, and the second airbag 30b to selectively direct inflation medium from the inflator 32 to the first airbag 30a and/or the second airbag 30b. The valve 42 is moveable to selectively connect the inflator 32 to the first airbag 30a and the second airbag 30b. The valve 42 may be a three-way valve, e.g., having an inlet port 48, and a first outlet port 50 and a second outlet port 52. The valve 42 may be moveable to a first position, shown in FIGS. 3 and 6. In the first position the valve 42 fluidly connects the inflator 32 to the first airbag 30a and fluidly disconnects the inflator 32 and the second airbag 30b, thereby providing inflation medium to the first airbag 30a and not the second airbag 30b. For example, the valve 42 in the first position may permit fluid flow from the inlet port 48 to the first outlet port 50 and inhibit fluid flow from the inlet port 48 to the second outlet port 52. The valve 42 may be moveable to a second position, shown in FIGS. 4 and 8. In the second position the valve 42 fluidly connects the inflator 32 to the second airbag 30b and fluidly disconnects the inflator 32 and the first airbag 30a. For example, the valve 42 in the second position may permit fluid flow from the inlet port 48 to the second outlet port 52 and inhibit fluid flow from the inlet port 48 to the first outlet port 50. The valve 42 may be moveable to a third position, shown in FIGS. 5, 7 and 9. In the third position the valve 42 fluidly connects the inflator 32 to the first airbag 30a and the second airbag 30b. For example, the valve 32 at the third position may block fluid flow from the inlet port 48 to the first outlet port 50 and the second outlet port 52.

With reference to FIGS. 3-10, the valve 42 may include a housing 54 and a body 56 disposed therein. The housing 54 may include the inlet port 48, the first outlet port 50 and the second outlet port 52. The inlet port 48 may be at a bottom of the housing 54 and the first outlet port 50 and the second outlet port 52 may be at sides of the housing 54. The body 56 may be spaced from the bottom and the inlet port 48. The body 56 may be rotatable within the housing 54 to the first position, the second position, and the third position. The body 56 in the first position may block the second outlet port 52. The body 56 in the second position may block the first outlet port 50. The body 56 in the third position may not block the first outlet port 50 or the second port. In other words, the first outlet port 50 and the second port may be open with the body 56 in the third position. The body 56 at the third position shown in FIG. 7 may be rotated generally 180 degrees relative to the body 56 at the third position shown in FIG. 9. The valve 42 may include any other suitable structure, e.g., a ball valve, including, in some examples, conventional structures.

The valve 42 may be operatively connected between the inflator 32, the first airbag 30a and the second airbag 30b, i.e., such that inflation medium can flow from the inflator 32 to the valve 42 and can then flow from the from the valve 42 to the first airbag 30a and/or the second airbag 30b. For example, the inflator 32 may be connected to the inlet port 48, the first airbag 30a may be connected to the first outlet port 50, and the second airbag 30b may be connected to the second outlet port 52, e.g., via tubing or other suitable structure. One revolute joint 44 may connect the inflator 32 to the first airbag 30a and another revolute joint 44 may connect the inflator 32 to the second airbag 30b, e.g., via the valve 42. The revolute joint 44 may be positioned at an intersection of the seatback 26 and the seat bottom 24. The revolute joint 44 may pivot along with a change in recline angle of the seatback 26. The revolute joint 44 may define an internal passage fluidly connecting and directing inflation medium to the respective first airbag 30a or second airbag 30b to the inflator 32. The revolute joints 44 may support the fill tubes 46 fluidly connecting the respective first airbag 30a or second airbag 30b to the inflator 32. The revolute joints 44 may be supported by, e.g., fixed to, the frames of the seatbacks 26 and/or the seat bottoms 24 of the first seat assembly 22a and the second seat assembly 22b. The fill tubes 46 may fluidly connect the revolute joints 44 to the inflator 32. For example, one fill tube 46 may extend from the first outlet port 50 to the revolute joint 44 supported by the first seat assembly 22a and another fill tube 46 may extend from the second outlet port 52 to the revolute joint 44 supported by the second seat assembly 22b. The fill tubes 46 may be of sufficient length to permit movement of the first seat assembly 22a and the second seat assembly 22b, e.g., along the vehicle-longitudinal axis A2 and a vehicle-vertical axis A3. The fill tubes 46 may be, for example, braided metal tubes connecting the revolute joints 44 to the inflator 32. The fill tubes 46 may be any other suitable material.

Figure 10:
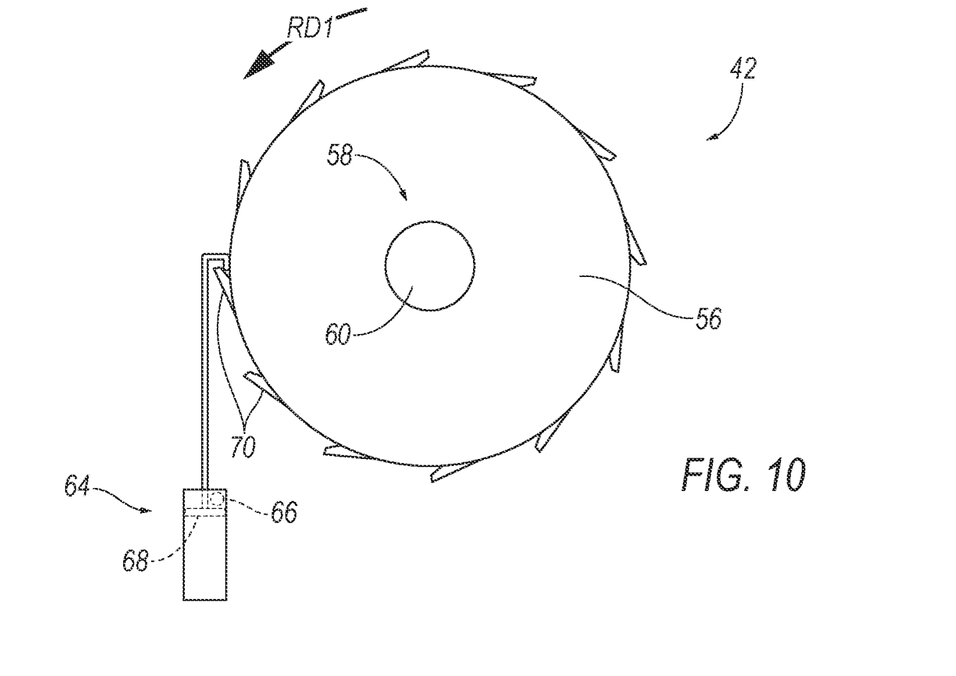
FIG. 10 is a top view of the valve with a first actuator and a second actuator for actuating the valve.
Figure 11:
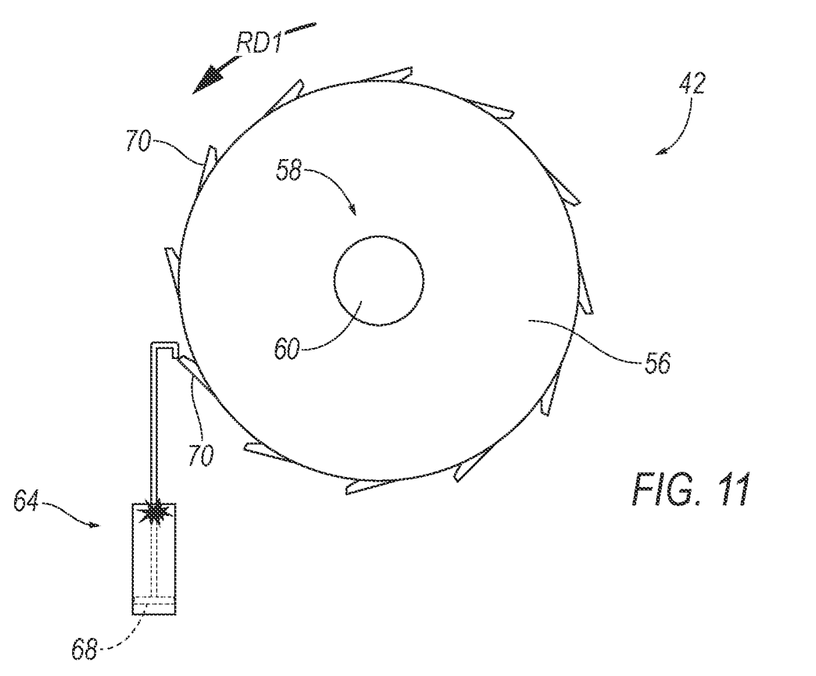
FIG. 11 is a top view of the valve with the second actuator actuating the valve to the third position.

The vehicle 20 may include a first actuator 58 configured to move the valve 42 from one position to another, e.g., to the first position or the second position. The first actuator 58 may include a motor 60. The motor 60 may be rotatably coupled to the body 56 of the valve 42, i.e., such that torque generated by the motor 60 can rotate the body 56 relative to the housing 54. The motor 60 may be rotably coupled to the body 56, e.g., via reduction gears (not shown) or any suitable structure. The first actuator 58 may include a position sensor (not shown) configured to detect the position of the body 56, e.g., for feedback control of the motor 60. The motor 60 may rotate the body 56 from the first position in a first rotational direction RD1 to the second position and may rotate the body 56 from the second position in the first rotational direction RD1 to the first position, e.g., as commanded by a computer 62 of the vehicle 20. The first actuator 58 may include any other suitable structure for moving the valve 42 from one position to another, including, in some examples, conventional valve actuation structures. For example, the first actuator 58 may include a servo, an electromagnetic solenoid, etc. The first actuator 58 may be supported by, e.g., fixed to, the housing 54 of the valve 42 or any other suitable structure of the vehicle 20. The first actuator 58 may be a component of the valve 42.

The vehicle 20 may include a second actuator 64 configured to move the valve 42 to the third position. The second actuator 64 may be a pyrotechnically-activated device. A pyrotechnically-activated device includes pyrotechnic material 66. The pyrotechnic material rapidly increases in volume upon actuation, e.g., in response to receiving an electrical pulse, and activates movement of the second actuator 64. The pyrotechnic material 66 may be combustible to produce gas. The pyrotechnic material 66 may be formed of a solid mixture of substances that, when ignited, react to produce the gas, e.g., sodium azide (NaNO3), potassium nitrate (KNO3), and silicon dioxide (SiO2), which react to form nitrogen gas (N2). For example, the second actuator 64 may include a piston 68 linkage, in which the pyrotechnic material 66 for example, drives a piston 68. In other examples, not shown, the second actuator 64 may include a ball-in-tube linkage, in which a pyrotechnic charge propels a ball or balls over a cogwheel; or any other suitable structure. The second actuator 64 may rotate the body 56 from the first position or the second position in the first rotational direction RD1. The second actuator 64 may permit free rotation of the body 56 in the first rotational direction RD1. For example, the second actuator 64 may be connected to the body 56 via ratchet teeth 70 that slide past each other in one direction and engage each other in another direction. The second actuator 64 may be supported by, e.g., fixed to, the housing 54 of the valve 42 or any other suitable structure of the vehicle 20. The second actuator 64 may be a component of the valve 42.

Figure 12:
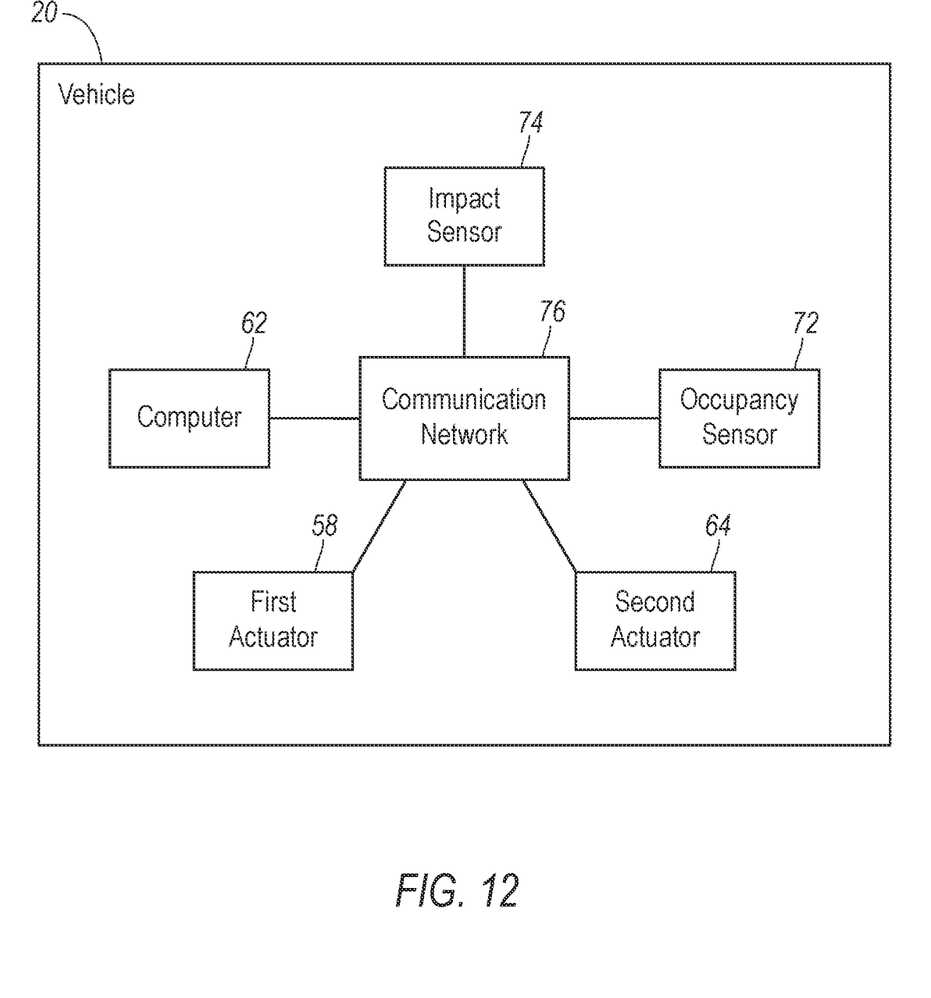
FIG. 12 is a block diagram of components of the vehicle.

With reference to FIG. 12, the vehicle 20 may include one or more occupancy sensors 72 configured to detect occupancy of the seat assemblies 22a, 22b. The occupancy sensors 72 may include visible-light or infrared cameras directed at the seat assemblies 22a, 22b, weight sensors supported by the seat bottoms 24, or other suitable structure, including, in some examples, conventional structures. The occupancy sensors 72 may provide data to the computer 62 of the vehicle 20, the data specifying whether the first seat assembly 22a is occupied or unoccupied, whether the second seat assembly 22b is occupied or unoccupied, etc.

The vehicle 20 may include one or more impact sensors 74 configured to detect certain potential impacts to the vehicle 20 and certain impacts to the vehicle 20. "Certain vehicle impact" is an impact of the type and/or magnitude for which inflation of the airbag 30a and/or 30b is designed i.e., "certain" indicates the type and/or magnitude of the impact. The type and/or magnitude of such "certain vehicle impacts" may be pre-stored in the computer 62, e.g., a restraints control module and/or a body control module. Detection of "potential certain vehicle impact" includes detection of the potential of a certain vehicle impact, as described further below. "Potential" means that the certain impact is more likely than not to occur. For example, "potential certain vehicle impact" indicates that the "certain vehicle impact" will occur unless the vehicle 20 or detected object (such as another vehicle) changes speed, trajectory, acceleration, etc. The impact sensor 74 may be of any suitable type, for example, post contact sensors such as accelerometers, pressure sensors, and contact switches; and pre-impact sensors such as radar, LIDAR, and vision sensing systems. The vision sensing systems may include one or more cameras, CCD image sensors, CMOS image sensors, etc. The impact sensor 74 may be located at numerous points in or on the vehicle 20.

The vehicle 20 may include a communication network 76. The communication network 76 includes hardware, such as a communication bus, for facilitating communication among vehicle components, e.g., the occupancy sensors 72, the computer 62, the impact sensors 74, the inflator 32, the first actuator 58, the second actuator 64, etc. The communication network 76 may facilitate wired or wireless communication among the vehicle components in accordance with a number of communication protocols such as controller area network (CAN), Ethernet, WiFi, Local Interconnect Network (LIN), and/or other wired or wireless mechanisms. Alternatively or additionally, in cases where the computer 62 comprises a plurality of devices, the communication network 76 may be used for communications between devices represented as the computer 62 in this disclosure.

The computer 62 may be a microprocessor-based computer implemented via circuits, chips, or other electronic components. The computer 62 includes a processor, a memory, etc. The memory of the computer 62 may include memory for storing programming instructions executable by the processor as well as for electronically storing data and/or databases. For example, the computer 62 can be a generic computer with a processor and memory as described above and/or may include an electronic control unit (ECU) or controller for a specific function or set of functions, and/or a dedicated electronic circuit including an ASIC that is manufactured for a particular operation, e.g., an ASIC for processing sensor data and/or communicating the sensor data. As another example, the computer 62 may be a restraints control module. In another example, computer 62 may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in the computer 62. The memory can be of any type, e.g., hard disk drives, solid state drives, servers, or any volatile or non-volatile media. The memory can store the collected data sent from the sensors.

The computer 62 is programmed to, i.e., the memory stories instructions executable by the processor to, move the valve 42 to the first position, the second position, or the third position. The computer 62 may move the valve 42 by transmitting a command to the first actuator 58, e.g., via the communication network 76. The command may specify the first position, the second position, or the third position. The command may specify actuation of the motor 60, e.g., in a certain rotational direction, a certain number of turns, until the body 56 is at a certain position. The computer 62 may move the valve 42, e.g., to the third position, by transmitting a command to the second actuator 64. The command may include, for example, a pulse that triggers the pyrotechnic material 66 of the second actuator 64.

The computer 62 is programmed to actuate the inflator 32 to provide inflation medium. The computer 62 may actuate the inflator 32 by transmitting a command to the inflator 32, e.g., via the communication network 76. The command may include, for example, a pulse that triggers the pyrotechnic material 66 of the inflator 32.

The computer 62 is programmed to detect certain potential impacts to vehicle 20, e.g., a certain potential impact to the first side 36 of the vehicle 20, a certain potential impact to the second side 38 of the vehicle 20, etc. The computer 62 may detect certain potential impacts to vehicle 20 based on data received from the impact sensors 74, e.g., via the communication network 76. The computer 62 may detect certain potential impacts with image recognition, object detection, trajectory prediction, threat probability analysis, and/or other analysis techniques, including, in some examples, conventional data analysis techniques.

The computer 62 is programmed to detect certain actual impacts to the vehicle 20, e.g., a certain impact to the first side 36 of the vehicle 20, a certain impact to the second side 38 of the vehicle 20, etc. For example, data from the impact sensors 74, such as accelerometers, pressure sensors, and contact switches, may indicate a certain impact to the first side 36 of the vehicle 20 or a certain impact to the second side 38 of the vehicle 20. For example, detected acceleration of the vehicle 20 in certain direction and at a certain magnitude may indicate a certain impact to the first side 36 of the vehicle 20 or a certain impact to the second side 38 of the vehicle 20. As another example, a detected pressure above a certain magnitude on a certain portion of the vehicle 20 may indicate a certain impact to the first side 36 of the vehicle 20 or a certain impact to the second side 38 of the vehicle 20.

The computer 62 is programmed to detect whether or not each of the seat assemblies 22a, 22b is occupied, e.g., whether the first seat assembly 22a is occupied, whether the second seat assembly 22b is occupied, etc. For example, data from the occupancy sensors 72, such as detecting weight above a threshold, detecting occupants in images, etc., may indicate that the first seat assembly 22a and/or the second seat assembly 22b are occupied.

Figure 13:
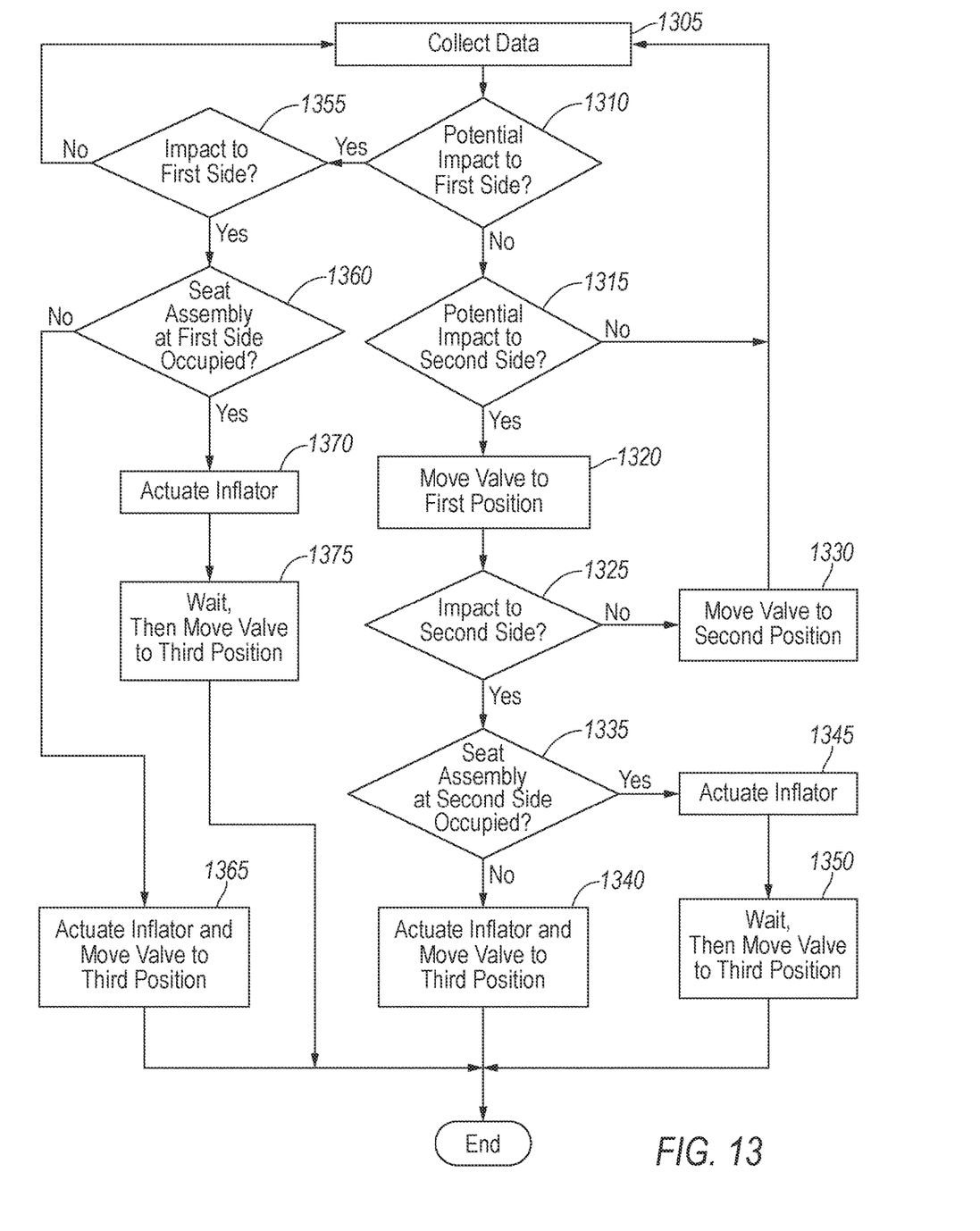
FIG. 13 is a flow chart showing a process for controlling the valve and the airbags.

FIG. 13 is a process flow diagram illustrating an exemplary process 1300 for controlling inflation of the first airbag 30a and the second airbag 30b. The process 1300 may be performed by the computer 62. In other words, the memory of the computer 62 may store instructions executable by the processor to perform the process 1300. The process 1300 begins in a block 1305 in which the computer 62 collects data, e.g., received via the communication network 76 from the occupancy sensor 72, the impact sensor 74, etc. The computer 62 may continue to receive data throughout the process 1300. Throughout the process 1300 in the present context means substantially continuously or at time intervals, e.g., every 100 milliseconds. The computer 62 may store the collected data, as well as other determinations, detections, commands, etc., received, performed, or transmitted throughout the process 1300. The valve 42 may initially be at the second position to provide inflation medium to the second airbag 30b and not the first airbag 30a when the process 1300 starts at the block 1305.

Next at a block 1310 the computer 62 determines whether a certain potential impact to the first side 36 of the vehicle 20 has been detected. The computer 62 determines whether a certain potential impact to the first side 36 of the vehicle 20 has been detected based on data received from the impact sensors 74, e.g., received via the communication network 76 and as described herein. In response to determining that a certain potential impact to the first side 36 of the vehicle 20 has not been detected the computer 62 moves to a block 1315. In response to determining that a certain potential impact to the first side 36 of the vehicle 20 has been detected the computer 62 moves to a block 1355.

At the block 1315 the computer 62 determines whether a certain potential impact to the second side 38 of the vehicle 20 has been detected. The computer 62 determines whether a certain potential impact to the second side 38 of the vehicle 20 has been detected based on data received from the impact sensors 74, e.g., received via the communication network 76 and as described herein. In response to determining that a certain potential impact to the second side 38 of the vehicle 20 has not been detected the computer 62 returns to the block 1305, e.g., repeating the process 1300. In response to determining that a certain potential impact to the second side 38 of the vehicle 20 has been detected the computer 62 moves to a block 1320.

At the block 1320 the computer 62 moves the valve 42 to the first position to provide inflation medium to the first airbag 30a and not the second airbag 30b. The computer 62 moves the valve 42 to the first position, e.g., by transmitting a command to the first actuator 58 via the communication network 76 and as described herein. After the block 1320 the computer 62 moves to the block 1325.

At the block 1325 the computer 62 determines whether a certain impact to the second side 38 of the vehicle 20 has been detected within a threshold amount of time of moving the valve 42 to the first position. The computer 62 determines whether a certain impact to the second side 38 of the vehicle 20 has been detected based on data from the impact sensors 74, e.g., received via the communication network 76. For example, the computer 62 may detect a certain impact to the second side 38 of the vehicle 20 when data from post contact sensors such as accelerometers, pressure sensors, and contact switches indicates that a certain impact to the second side 38 of the vehicle 20 has occurred. The threshold amount of time is a sufficient amount of time for the detected certain potential impact to actually occur. In other words, if the detected certain potential impact to the second side 38 of the vehicle 20 does not occur within the threshold amount of time, then the detected certain potential impact will not likely become a certain impact to the second side 38 of the vehicle 20. For example, the threshold amount of time may be at least three seconds. If a certain impact to the second side 38 of the vehicle 20 is not detected within the threshold amount of time of moving the valve 42 to the first position, the computer 62 moves to a block 1330. In response to detecting a certain impact to the second side 38 of the vehicle 20 within the threshold amount of time of moving the valve 42 to the first position, the computer 62 moves to a block 1335.

At the block 1330 the computer 62 moves the valve 42 back to the second position. The computer 62 moves the valve 42 to the second position, e.g., by transmitting a command to the first actuator 58 via the communication network 76 and as described herein. After the block 1330 the computer 62 returns to the block 1305, e.g., repeating the process 1300.

At the block 1335 the computer 62 detects whether or not the second seat assembly 22b at the second side 38 of the vehicle 20 is occupied. The computer 62 determines whether or not the second seat assembly 22b is occupied based on data from the occupancy sensors 72, e.g., received via the communication network 76 and as described herein. In response to detecting that the second seat assembly 22b is not occupied the computer 62 moves to a block 1340. In response to detecting that the second seat assembly 22b is occupied the computer 62 moves to a block 1345.

At the block 1340 the computer 62 actuates the inflator 32 to provide inflation medium and moves the valve 42 to the third position to provide inflation medium to the first airbag 30a and the second airbag 30b. The computer 62 actuates the inflator 32 to provide inflation medium, e.g., by transmitting a command, such as a pulse, via the communication network 76 and as described herein. The computer 62 moves the valve 42 to the third position, e.g., by transmitting a command, such as a pulse, to the second actuator 64 via the communication network 76 and as described herein. The computer 62 may actuate the inflator 32 and move valve 42 to the third position substantially simultaneously, i.e., such that the first airbag 30a and the second airbag 30b are inflated to inflated positions at a same time. After the block 1340 the process 1300 ends.

At the block 1345 the computer 62 actuates the inflator 32 to provide inflation medium, e.g., by transmitting a command, such as a pulse, via the communication network 76 and as described herein. After the block 1345 the computer 62 moves to a block 1350.

At the block 1350 the computer 62 first waits a predetermined amount of time, then, after the predetermined amount of time has lapsed after actuating the inflator 32 to provide inflation medium, the computer 62 moves the valve 42 to the third position. The computer 62 moves the valve 42 to the third position, e.g., by transmitting a command, such as a pulse, to the second actuator 64 via the communication network 76 and as described herein. The predetermined amount of time is a sufficient amount of time to permit the first airbag 30a to inflate first, i.e., such that the first airbag 30a is inflated to the inflated position prior to the second airbag 30b being inflated to the inflated position. The predetermined amount of time may be sufficiently short such that the second airbag 30b is inflated to control kinematics of an occupant of the second seat during the detected certain impact to the second side 38 of the vehicle 20. For example, the predetermined amount of time may be 10 to 30 milliseconds. The predetermined amount of time may be empirically determined, e.g., via vehicle 20 crash testing, and/or may be determined via simulation, e.g., using conventional computer engineering simulation and design software. After the block 1350 the process 1300 ends.

At the block 1355 the computer 62 determines whether a certain impact to the first side 36 of the vehicle 20 has been detected. The computer 62 determines whether a certain impact to the first side 36 of the vehicle 20 has been detected based on data from the impact sensors 74, e.g., received via the communication network 76. If a certain impact to the first side 36 of the vehicle 20 has not been detected the computer 62 returns to the block 1305, e.g., repeating the process 1300. In response to detecting a certain impact to the first side 36 of the vehicle 20 the computer 62 moves to a block 1360.

At the block 1360 the computer 62 detects whether or not the first seat assembly 22a at the first side 36 of the vehicle 20 is occupied. The computer 62 determines whether or not the first seat assembly 22a is occupied based on data from the occupancy sensors 72, e.g., received via the communication network 76 and as described herein. In response to detecting that the first seat assembly 22a is not occupied the computer 62 moves to a block 1365. In response to detecting that the first seat assembly 22a is occupied the computer 62 moves to a block 1370.

At the block 1365 the computer 62 actuates the inflator 32 to provide inflation medium and moves the valve 42 to the third position. The computer 62 actuates the inflator 32 to provide inflation medium, e.g., by transmitting a command, such as a pulse, via the communication network 76 and as described herein. The computer 62 moves the valve 42 to the third position, e.g., by transmitting a command, such as a pulse, to the second actuator 64 via the communication network 76 and as described herein. The computer 62 may actuate the inflator 32 and move valve 42 to the third position substantially simultaneously, i.e., such that the first airbag 30a and the second airbag 30b are inflated to inflated positions at a same time. After the block 1365 the process 1300 ends.

At the block 1370 the computer 62 actuates the inflator 32 to provide inflation medium, e.g., by transmitting a command, such as a pulse, via the communication network 76 and as described herein. After the block 1370 the computer 62 moves to a block 1375.

At the block 1375 the computer 62 first waits a predetermined amount of time, and then, after the predetermined amount of time has lapsed after actuating the inflator 32 to provide inflation medium, the computer 62 moves the valve 42 to the third position. The predetermined amount of time is a sufficient amount of time for permit the second airbag 30b to inflate first, e.g., as decided above. The predetermined amount of time may be, for example, 10 to 30 milliseconds. After the block 1375 the process 1300 ends.

In the drawings, the same reference numbers indicate the same elements. With regard to the media, processes, systems, methods, etc. described herein, it should be understood that, although the steps of such processes, etc. have been described as occurring according to a certain ordered sequence, unless indicated otherwise or clear from context, such processes could be practiced with the described steps performed in an order other than the order described herein. Likewise, it further should be understood that certain steps could be performed simultaneously, that other steps could be added, or that certain steps described herein could be omitted.

The adjectives "first" and "second" are used throughout this document as identifiers and do not signify importance, order, or quantity.

Computer executable instructions may be compiled or interpreted from computer 62 programs created using a variety of programming languages and/or technologies, including, without limitation, and either alone or in combination, Java, C, C, Visual Basic, Java Script, Perl, HTML, etc. In general, a processor e.g., a microprocessor receives instructions, e.g., from a memory, a computer readable medium, etc., and executes these instructions, thereby performing one or more processes, including one or more of the processes described herein. Such instructions and other data may be stored and transmitted using a variety of computer readable media. A file in a networked device is generally a collection of data stored on a computer readable medium, such as a storage medium, a random-access memory, etc. A computer readable medium includes any medium that participates in providing data e.g., instructions, which may be read by a computer. Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer 62 can read.

Use of in "response to," "based on," and "upon determining" herein indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A vehicle, comprising:
a seat assembly having a seat bottom and a seatback;
a middle console adjacent the seat assembly;
an airbag inflatable from an uninflated position to an inflated position, the airbag being supported by the seatback in the uninflated position and the inflated position; and
an inflator supported by the middle console, the inflator operatively connected to the airbag to provide inflation medium.

2. The vehicle of claim 1, further comprising:
a second seat assembly having a seat bottom and a seatback; and
a second airbag inflatable from an uninflated position to an inflated position, the second airbag being supported by the seatback of the second seat assembly;
the inflator being operatively connected to the second airbag.

3. The vehicle of claim 2, further comprising a valve between the inflator, the airbag, and the second airbag, the valve being moveable to selectively connect the inflator to the airbag and the second airbag.

4. The vehicle of claim 2, further comprising a valve between the inflator, the airbag and the second airbag, the valve being movable between:
a first position in which the valve fluidly connects the inflator to the airbag and fluidly disconnects the inflator and the second airbag, providing inflation medium to the airbag and not the second airbag, a second position in which the valve fluidly connects the inflator to the second airbag and fluidly disconnects the inflator and the airbag, and a third position in which the valve fluidly connects the inflator to the airbag and the second airbag.

5. The vehicle of claim 4, further comprising a computer having a processor and a memory storing instructions executable by the processor to:

move the valve to the first position or the second position, then, actuate the inflator to provide inflation medium, and then, move the valve to the third position.

6. The vehicle of claim 5, wherein the instructions include instructions to move the valve to the third position a predetermined amount of time after actuating the inflator to provide inflation medium.

7. The vehicle of claim 4, further comprising an actuator configured to move the valve to the first position and the second position.

8. The vehicle of claim 7, further comprising a second actuator configured to move the valve to the third position.

9. The vehicle of claim 8, wherein the actuator includes a motor and the second actuator is a pyrotechnically-activated device.

10. The vehicle of claim 4, wherein the valve is initially at the first position, and further comprising a computer having a processor and a memory storing instructions executable by the processor to:

detect a certain potential impact to a first side of the vehicle, and in response to detecting the certain potential impact to the first side of the vehicle, move the valve to the second position.

11. The vehicle of claim 10, wherein the instructions include instructions to:

detect a certain impact to the first side of the vehicle, and in response to detecting the certain impact to the first side of the vehicle, actuate the inflator to provide inflation medium and move the valve to the third position.

12. The vehicle of claim 11, wherein the instructions include instructions to:

detect whether the second seat assembly is occupied, and in response to detecting that the second seat assembly is occupied, move the valve to the third position a predetermined amount of time after actuating the inflator to provide inflation medium.

13. The vehicle of claim 12, wherein the predetermined amount of time is 10 to 30 milliseconds.

14. The vehicle of claim 12, wherein the instructions include instructions to:

detect a certain impact to a second side of the vehicle, and in response to detecting the certain impact to the second side of the vehicle, actuate the inflator to provide inflation medium and move the valve to the third position the predetermined amount of time after actuating the inflator to provide inflation medium.

15. The vehicle of claim 11, wherein the instructions include instructions to:

determine that a certain impact to the first side of the vehicle has not been detected within a predetermined amount of time from moving the valve to the first position, and in response to determining that the certain impact to the first side of the vehicle has not been detected, move the valve to the second position.

16. The vehicle of claim 1, further comprising a revolute joint connecting the inflator to the airbag.

17. The vehicle of claim 16, further comprising a braided metal tube connecting the revolute joint to the inflator.

18. The vehicle of claim 1, further comprising a fill tube extending from the middle console to the seatback, the fill tube connecting the inflator to the airbag.

19. The vehicle of claim 18, further comprising a space between the middle console and the seat assembly, the fill tube extending across the space.

20. The vehicle of claim 18, further comprising a revolute joint between the fill tube and the airbag.

* * * * *